United States Patent [19]

Okuno

[11] Patent Number: 4,578,688

[45] Date of Patent: Mar. 25, 1986

[54] LIGHT BEAM PRINTER

[75] Inventor: Takuo Okuno, Yokohama, Japan

[73] Assignee: Canon Kabushiki Kaisha, Tokyo, Japan

[21] Appl. No.: 598,269

[22] Filed: Apr. 9, 1984

[30] Foreign Application Priority Data

Apr. 12, 1983 [JP] Japan ................................. 58-63029

[51] Int. Cl.[4] .......................................... G01D 15/121
[52] U.S. Cl. ..................... 346/157; 346/160; 350/6.8
[58] Field of Search ............... 346/108, 157, 160, 762; 358/75, 292; 250/234; 350/6.7, 6.8

[56] References Cited

U.S. PATENT DOCUMENTS

| Re. 28,693 | 1/1976 | Doi et al. | 346/157 |
| 2,986,466 | 5/1961 | Kaprelian | 358/75 |
| 3,780,214 | 12/1973 | Bestenreiner et al. | 358/75 |
| 4,040,737 | 8/1976 | Masaki et al. | 355/49 |
| 4,467,334 | 8/1984 | Anzai | 346/108 X |

Primary Examiner—E. A. Goldberg
Assistant Examiner—A. Evans
Attorney, Agent, or Firm—Fitzpatrick, Cella, Harper & Scinto

[57] ABSTRACT

This specification discloses a light beam printer which is provided with a plurality of electrophotographic photosensitive medium scanned by light beams and in which toner images of different colors are transferred onto a transfer medium in superposed relationship with each other. Each of the light beams depicts a curved movement locus on each of the photosensitive mediums, and the directions of curvature of the movement locuses correspond to each other and the amounts of curvature of the movement locuses are substantially equal to each other.

6 Claims, 3 Drawing Figures

LIGHT BEAM PRINTER

BACKGROUND OF THE INVENTION

1. Field of the Invention

This invention relates to a printer which is provided with a plurality of electrophotographic photosensitive mediums and which forms images of plural colors.

2. Description of the Prior Art

A stationary ghost light flux is created when a photosensitive medium is scanned by a light beam modulated by a recorded image information signal. The reason that such stationary ghost light flux is created is described in U.S. Pat. No. 4,040,737. That is, part of the light beam having entered the photosensitive medium is reflected by the photosensitive medium. This reflected light travels back through a focusing lens and again enters the rotatable polygonal mirror, and is again reflected by the polygonal mirror and enters the focusing lens. Thus, the light flux having left the focusing lens is stationary in spite of the polygonal mirror being rotated. Such stationary light flux is called a stationary ghost light flux. If the stationary ghost light flux overlaps the scanning locus of the light beam on the photosensitive medium, there will be formed a noise in the image.

To prevent the above-noted incovenience, the technique disclosed in U.S. Pat. No. 4,040,737 is adapted in the conventional apparatus shown in FIG. 1 of the accompanying drawings.

In FIG. 1, a semiconductor laser 1 emits a laser beam L modulated correspondingly to an image information signal. This laser beam L is scanned by a polygonal mirror 3 rotatively driven at a constant speed by a motor 2. The laser beam L deflected by the polygonal mirror 3 is focused to a drum-like electrophotographic photosensitive medium 6 rotated in the direction of arrow, by a lens 4 having an f-$\theta$ characteristic. Designated by 5 is a mirror for deflecting the optical path. Since the laser beam L is scanned by the polygonal mirror 3, it moves on the photosensitive medium 6.

To separate the stationary ghost light flux from the optical path of the laser beam which is to scan the photosensitive medium 6, the laser beam L is caused to enter the polygonal mirror 3 from a direction inclined by an angle $-\alpha$ with respect to an imaginary plane perpendicular to the rotary shaft 10 of the polygonal mirror 3. In other words, the polygonal mirror 3 is rotated about the shaft 10 inclined by an angle other than 90° with respect to the laser beam L entering the polygonal mirror 3. Thus, the stationary ghost light flux is separated from the optical path of the laser beam scanning the photosensitive medium and is intercepted relative to the photosensitive medium by a light-intercepting member 8. The laser beam scanning the photosensitive medium 6 passes through a slit-like opening 8' provided in the light-intercepting member 8.

Reference numeral 1' designates the line of intersection between an imaginary plane perpendicular to the rotary shaft 10 of the polygonal mirror 3 and an imaginary plane containing the axis of the laser beam L entering the polygonal mirror 3 and parallel to the shaft 10. The fact that the laser beam L is inclined by an angle $-\alpha$ with respect to the imaginary plane perpendicular to the shaft 10 means that the angle formed between the laser beam L and the imaginary line of intersection 1' is $-\alpha$.

In any case, if the laser beam L is inclined by the angle $-\alpha$ with respect to the imaginary line of intersection 1', the movement locus A of the laser beam L on the photosensitive medium 6 (the scanning line on the photosensitive medium) will be curved as shown.

Assuming that as shown in FIG. 2 of the accompanying drawings, the maximum amount of curvature of this curved scanning line is $\Delta x$, the focal length of the lens 4 is f and the full scanning width on the photosensitive medium 6 is l, the maximum amount of curvature $\Delta x$ is $$\Delta x = \left| f \tan \alpha \times \left( \frac{l}{2f} / \sin \frac{l}{2f} - 1 \right) \right| \tag{1}$$

Assuming that as an example, $-\alpha = -40'$, $f = 220$ mm and $l = 250$ mm, then $\Delta x = 0.14$ mm. If $-\alpha = 40'$, the direction of curvature of the scanning line will be opposite to the direction of curvature of the scanning line A as indicated by broken line (A) in FIG. 2.

Heretofore, the above-described degree of curvature has been difficult to sense by the naked eye and has offered no problem in a monochromatic printer. However, in the case of a color laser printer, if the degrees and directions of curvature of the scanning lines formed on the photosensitive drums for respective colors differ from each other, there will occur color misregistration on a transfer medium. The misregistration between images of various colors is very conspicuous and the quality of the color image is reduced. The allowance of the amount of color misregistration (the amount of misregistration between a first color image and a second color image) is usually 0.1 mm. Accordingly, if the direction of curvature of the first scanning line on a first photosensitive medium and the direction of curvature of the second scanning line on a second photosensitive medium differ from each other or the degrees of curvature of the first scanning line and the second scanning line greatly differ from each other and the amount of color misregistration exceeds 0.1 mm, the quality of the image will be deteriorated.

In FIG. 1, the photosensitive medium 6 is charged by a charger 11 and thereafter is exposed to the laser beam L. Thereby, an electrostatic latent image is formed on the photosensitive medium 6. This latent image is developed by a developing device 12 which supplies toner to the photosensitive medium. The visible image thus obtained is transferred to a transfer medium 7 by a transfer charger 13.

SUMMARY OF THE INVENTION

It is an object of the present invention to provide a light beam printer using a plurality of electrophotographic photosensitive mediums for forming images of different colors.

It is another object of the present invention to provide a light beam printer which is capable of images of plural colors having a high quality.

It is still another object of the present invention to provide a light beam printer which is capable of forming images of plural colors free of misregistration therebetween or having practically negligible misregistration therebetween.

Other objects and features of the present invention will become apparent from the following detailed description taken in conjunction with the accompanying drawings.

DESCRIPTION OF THE PREFERRED EMBODIMENT

Figure 1:
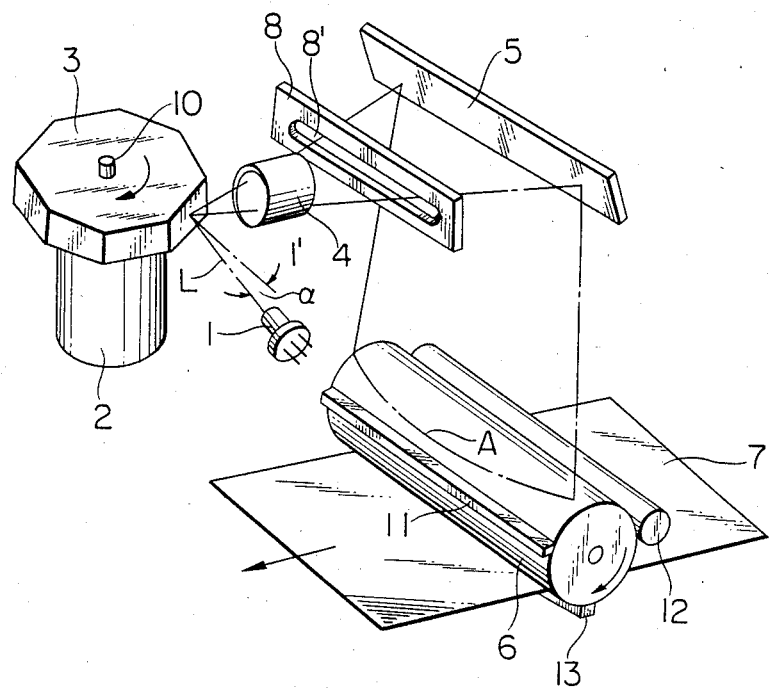
FIG. 1 illustrates a monochromatic printer according to the prior art.
Figure 2:
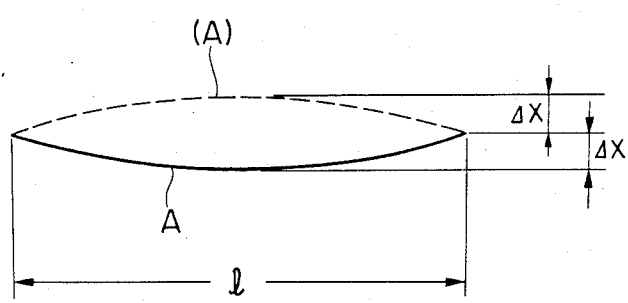
FIG. 2 illustrates scanning lines.
Figure 3:
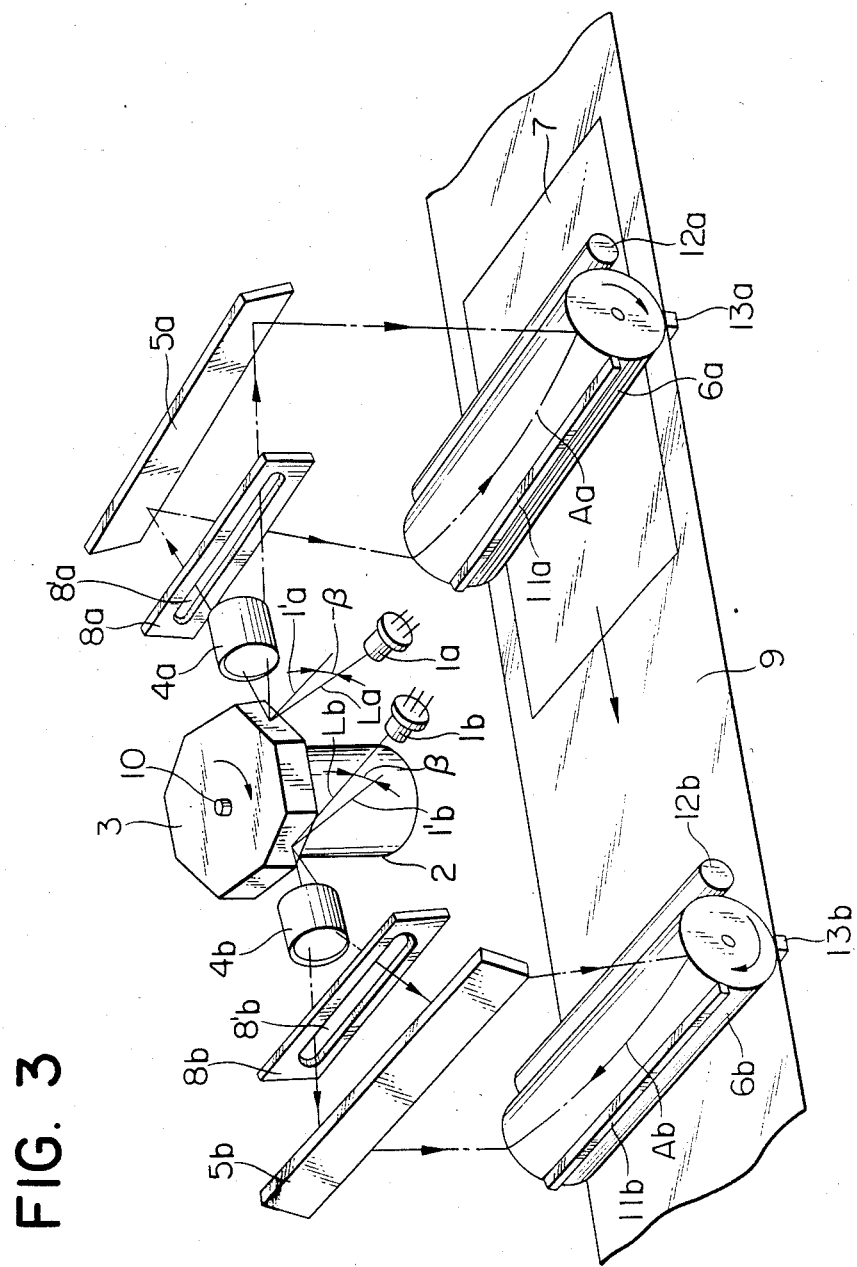
FIG. 3 illustrates an embodiment of the preset invention.

In FIG. 3, members and means given reference numerals having suffixes a and b attached thereto are similar in operation to the members and means of FIG. 1. That is, 1a and 1b designate semiconductor lasers. The semiconductor laser 1a emits a laser beam La modulated correspondingly to a magenta color image signal, and the semiconductor laser 1b emits a laser beam Lb modulated correspondingly to a yellow color image signal. Both of the laser beams La and Lb are scanned by a polygonal mirror 3 rotatively driven about a rotary shaft 10 at a constant speed by a motor 2. The beams La and Lb enter the polygonal mirror 3 at different positions in the path of rotation of the polygonal mirror 3. In other words, the beams La and Lb enter the different reflecting surfaces of the polygonal mirror 3.

The beams La and Lb are focused on drum-like electrophotographic photosensitive mediums 6a and 6b, respectively, by focusing lenses 4a and 4b each having an f-θ characteristic. Designated by 5a and 5b are mirrors for bending the optical paths. As shown, the photosensitive mediums 6a and 6b are disposed at opposite positions with respect to the polygonal mirror 3. Also, the photosensitive mediums 6a and 6b have substantially the same diameter. The length of the optical path between the polygonal mirror 3 and the photosensitive medium 6a and the length of the optical path between the polygonal mirror 3 and the photosensitive medium 6b are substantially equal to each other. The lenses 4a and 4b have substantially the same focal length. Accordingly, the length of the optical path between the lens 4a and the photosensitive medium 6a and the length of the optical path between the lens 4b and the photosensitive medium 6b are substantially equal to each other.

The beam La entering the polygonal mirror 3 is inclined by an angle $-\beta$ with respect to an imaginary plane perpendicular to the rotary shaft 10 of the polygonal mirror 3. That is, the beam La forms the angle $-\beta$ with respect to the line of intersection 1'a between the imaginary plane perpendicular to the shaft 10 and an imaginary plane parallel to the shaft 10 and containing the axis of the beam La.

On the other hand, the beam Lb entering the polygonal mirror 3 is inclined by an angle $+\beta$ with respect to an imaginary plane perpendiuclar to the rotary shaft 10 of the polygonal mirror 3. That is, the beam Lb forms the angle $+\beta$ with respect to the line of intersection 1'b between the imaginary plane perpendicular to the shaft 10 and an imaginary plane parallel to the shaft 10 and containing the axis of the beam Lb.

In other words, the beams La and Lb are inclined in the opposite directions with respect to the imaginary plane perpendicular to the shaft 10. However, the absolute value of the angle of inclination of the beam La with respect to said imaginary plane and the absolute value of the angle of inclination of the beam Lb with respect to said imaginary plane are substantially equal to each other.

In other words, the rotary shaft 10 of the polygonal mirror 3 is inclined by an angle $-(90°-\beta)$ relative to the beam La. On the other hand, the rotary shaft 10 of the polygonal mirror 3 is inclined by an angle $+(90°-\beta)$ relative to the beam Lb. The direction of inclination of the shaft 10 relative to the beam La and the direction of inclination of the shaft 10 relative to the beam Lb are opposite to each other. However, the absolute value of the angle of inclination of the shaft 10 relative to the beam La and the absolute value of the angle of inclination of the shaft 10 relative to the beam Lb are substantially equal to each other.

In any case, for the same reason as that set forth in connection with FIG. 1, the stationary ghost light flux resulting from the light reflected by the photosensitive medium 6a is intercepted relative to the photosensitive medium 6a by a light-intercepting member 8a and the stationary ghost light flux resulting from the light reflected by the photosensitive medium 6b is intercepted relative to the photosensitive medium 6b by a light-intercepting member 8b.

The movement locus of the beam La on the photosensitive medium 6a, i.e., the scanning line Aa, and the movement locus of the beam Lb on the photosensitive medium 6b, i.e., the scanning line Ab, are both curved as shown. Since the directions of inclination of the beams La and Lb relative to the imaginary plane perpendicular to the rotary shaft 10 of the polygonal mirror 3 are opposite to each other, the directions in which the scanning lines Aa and Ab are curved are the same, as shown. Also, assuming that the focal lengths of the lenses 4a and 4b are f and that the widths of the scanning lines Aa and Ab are l, the maximum amounts of curvature $\Delta x'$ and $\Delta x''$ of the scanning lines Aa and Ab are given by equation (1) as follows:

$$\Delta x'' = \Delta x' = \left| f \tan \beta \times \left( \frac{l}{2f} / \sin \frac{l}{2f} - 1 \right) \right|$$

and the two are entirely the same. Accordingly, the amounts of curvature of the scanning lines Aa and Ab are substantially the same although there is some difference between the two due to the arrangement error of the optical system and the accuracy errors of the optical parts. In this manner, by the scanning of the respective modulated light beams from the semiconductor lasers 1a and 1b, electrostatic latent images by the scanning lines having substantially the same amount of curvature in the same direction are formed one after another on the photosensitive mediums 6a and 6b. Thus, when the magenta color image formed on the photosensitive medium 6a and the yellow color image formed on the photosensitive medium 6b are transferred to a transfer medium in superposed relationship with each other, the misregistration between the two images becomes substantially null.

The amount of curvature of the scanning line Aa and the amount of curvature of the scanning line Ab need not always be completely the same, but if the difference between the two is within 0.1 mm, the aforementioned misregistration between the two images is practically negligible. Accordingly, if said difference is within 0.1 mm, it may be said that the amount of curvature of the scanning line Aa and the amount of curvature of the scanning line Ab are substantially the same.

The photosensitive mediums 6a and 6b are exposed to the laser beams La and Lb after they have been charged by chargers 11a and 11b. The latent image formed on the photosensitive medium 6a is developed by a developing device 12a which supplies magenta color toner to the photosensitive medium. On the other hand, the latent image formed on the photosensitive medium 6b is developed by a developing device 12b which supplies yellow color toner to the photosensitive medium. A transfer medium 7 is placed on a conveyor belt 9 and is caused to pass the photosensitive mediums 6a and 6b in succession. The magenta color image is transferred from the photosensitive medium 6a to the transfer medium 7 by a transfer charger 13a, and then the yellow color image is transferred from the photosensitive medium 6b to the transfer medium 7 by a transfer charger 13b. After completion of the image transfer, the transfer medium is transported to fixing device, not shown. The portions of the transfer medium 7 on which the magenta color and the yellow color have been superposed one upon the other become red images.

In FIG. 3, one more set of apparatuses similar to the apparatus shown in FIG. 3 (but different in colors of the developers from magenta and yellow) may be disposed downstream of the photosensitive medium 6b with respect to the direction of conveyance of the transfer medium.

Although, in the above-described embodiment, a common rotatable polygonal mirror is used for two photosensitive mediums, a rotatable polygonal mirror exclusively for use each photosensitive medium may be used. In this case, the number of the rotatable polygonal mirror required will be the same as the number of the photosensitive mediums.

What I claim is:

1. A light beam printer including:
  means for forming a first light beam modulated corresponding to a frist image informatin signal;
  means for forming a second light beam modulated corresponding to a second image information signal;
  a first movable photosensitive medium exposed to said first light beam to form a first color image;
  a second movable photosensitive medium exposed to said second light beam to form a second color image;
  a first rotatable polygonal mirror for scanning said first light beam, said first polygonal mirror being rotated about an axis inclined with respect to said first light beam entering said first polygonal mirror so that said first light beam depicts a first curved movement locus on said first photosensitive medium;
  a second rotatable polygonal mirror for scanning said second light beam, said second polygonal mirror being rotated about an axis inclined with respect to said second light beam entering said second polygonal mirror by such an angle that said second light beam depicts on said first photosensitive medium a second movement locus curved in the same direction and by the substantially same amount as the first movement locus; and
  means for transferring said first color image and said second color image onto the same transfer medium in superposed relationship with each other.

2. A printer according to claim 1, further including:
  a first lens disposed in the optical path between said first polygonal mirror and said first photosensitive medium to focus said first light beam to said first photosensitive medium;
  first intercepting means for intercepting, relative to said first photosensitive medium, a stationary ghost light flux formed when said first light beam irradiates said second photosensitive medium;
  a second lens disposed in the optical path between said second polygonal mirror and said second photosensitive medium to focus said second light beam to said first photosensitive medium; and
  second intercepting means for intercepting, relative to said second photosensitive medium, a stationary ghost light flux formed when said second light beam irradiates said second photosensitive medium.

3. A printer according to claim 2, wherein said first polygonal mirror is rotated about an axis inclined with respect to said first light beam entering said first polygonal mirror, and said second polygonal mirror is rotated about an axis inclinded with respect to said second light beam entering said second polygonal mirror.

4. A printer according to claim 3, wherein the focal length of said first lens and the focal length of said second lens are substantially equal to each other, and the absolute value of the angle formed by the rotational axis of said first polygonal mirror with respect to said first light beam and the absolute value of the angle formed by the rotational axis of said second polygonal mirror with respect to said second light beam are substantially equal to each other.

5. A light beam printer including:
  means for forming a first light beam modulated corresponding to a first image information signal;
  means for forming a second light beam modulated corresponding to a second image informatin signal;
  a first movable photosensitive medium exposed to said first light beam to form a first color image;
  a second movable photosensitive medium exposed to said second light beam to form a second color image;
  a rotatable polygonal mirror for scanning said first and second light beams, said first photosensitive medium and said second photosensitive medium being disposed at opposite positions with respect to said polygonal mirror, and said first light beam and said second light beam entering said polygonal mirror at different positions in the path of rotation of said polygonal mirror and being inclined with respect to an imaginary plane perpendicular to the rotational axis of said polygonal mirror;
  means for transferring said first color image and said second color image onto the same transfer medium in superposed relationship with each other; and
  wherein the direction of inclination of said first light beam with respect to said imaginary plane and the direction of inclination of said second light beam with respect to said imaginary plane are opposite to each other and the absolute value of the angle of inclination of said first light beam with respect to said imaginary plane and the absolute value of the angle of inclination of said secod second light beam with respect to said imaginary plane are substantially equal to each other so that a first movement locus depicted by said first beam on said first photosensitve medium and a second movement locus depicted by said second beam on said second photosensitive medium curve in the same direction and by the substantially same amount.

6. A printer according to claim 5, further including:
a first lens disposed in the optical path between said polygonal mirror and said first photosensitive medium to focus said first light beam to said first photosensitive medium;
first intercepting means for intercepting, relative to said first photosensitive medium, a stationary ghost light flux formed when said first light beam irradiates said first photosensitive medium;
a second lens disposed in the optical path between said polygonal mirror and said second photosensitive medium to focus said second light beam to said second photosensitive medium, the focal length of said first lens and the focal length of said second lens are substantially equal to each other; and
second intercepting means for intercepting, relative to said second photosensitive medium, a stationary ghost light flux formed when said second light beam irradiates said second photosensitive medium.

* * * * *

UNITED STATES PATENT AND TRADEMARK OFFICE
CERTIFICATE OF CORRECTION

PATENT NO. : 4,578,688

DATED : March 25, 1986

INVENTOR(S) : TAKUO OKUNO

It is certified that error appears in the above-identified patent and that said Letters Patent is hereby corrected as shown below:

Column 1, line 26, change "incovenience" to --inconvenience--.

Column 3, line 6, change "preset" to --present--; and
line 55, change "perpendiuclar" to --perpendicular--.

Column 5, line 31, change "for use each" to --for use with each--;
line 33, change "mirror" to --mirrors--;
line 38, change "frist" to --first--; and change "informatin" to --information--.

Column 6, line 35, change "informatin" to --information--; and
line 61, delete "secod".

ON THE COVER:

Abstract line 3, change "medium to --media--.

Signed and Sealed this

Thirteenth Day of January, 1987

Attest:

DONALD J. QUIGG

Attesting Officer    Commissioner of Patents and Trademarks